United States Patent
Williams

Patent Number: 5,335,440
Date of Patent: Aug. 9, 1994

[54] FISHING ROD HOLDER SYSTEM

[76] Inventor: Roosevelt Williams, 7601 Macedonia Rd., Oakwood, Ohio 44146

[21] Appl. No.: 108,234

[22] Filed: Aug. 19, 1993

[51] Int. Cl.⁵ ............................................. A01K 97/10
[52] U.S. Cl. ..................................... 43/21.2; 43/54.1; 248/538
[58] Field of Search .................... 43/55, 54.1, 21.2; 248/538, 514

[56] References Cited

U.S. PATENT DOCUMENTS

| | | | |
|---|---|---|---|
| 2,852,218 | 9/1958 | Stires | 248/514 |
| 2,869,814 | 1/1959 | Hurlimann | 248/538 |
| 3,659,369 | 5/1972 | Hermanson | 43/55 |
| 3,835,568 | 9/1974 | Whitfield | 43/21.2 |
| 4,845,881 | 7/1989 | Ward | 43/21.2 |
| 5,054,738 | 10/1991 | Harding | 43/21.2 |
| 5,131,179 | 7/1992 | McEwen | 43/21.2 |

FOREIGN PATENT DOCUMENTS 0554898  2/1957  Belgium ................. 43/21.2

*Primary Examiner*—P. Austin Bradley
*Assistant Examiner*—James Miner
*Attorney, Agent, or Firm*—Hugh E. Smith

[57] ABSTRACT

A fishing rod holder adapted to support a fishing rod comprising a member formed of a rigid material, the member being shaped to form two parallel long extents spaced a distance from each other sufficient to receive the handle of a fishing rod, the long parallel extents having a forward end whereat the member is down-turned to form two short parallel extents terminating in a closed end for receiving thereabove a forward portion of a fishing rod handle, the long parallel extents having a rearward end whereat the rod is up-turned to form two short parallel extents terminating in a closed end for receiving therebeneath a rearward portion of a fishing rod handle; and attachment means secured to the long parallel extents of the member for releasably coupling to a bucket.

3 Claims, 4 Drawing Sheets

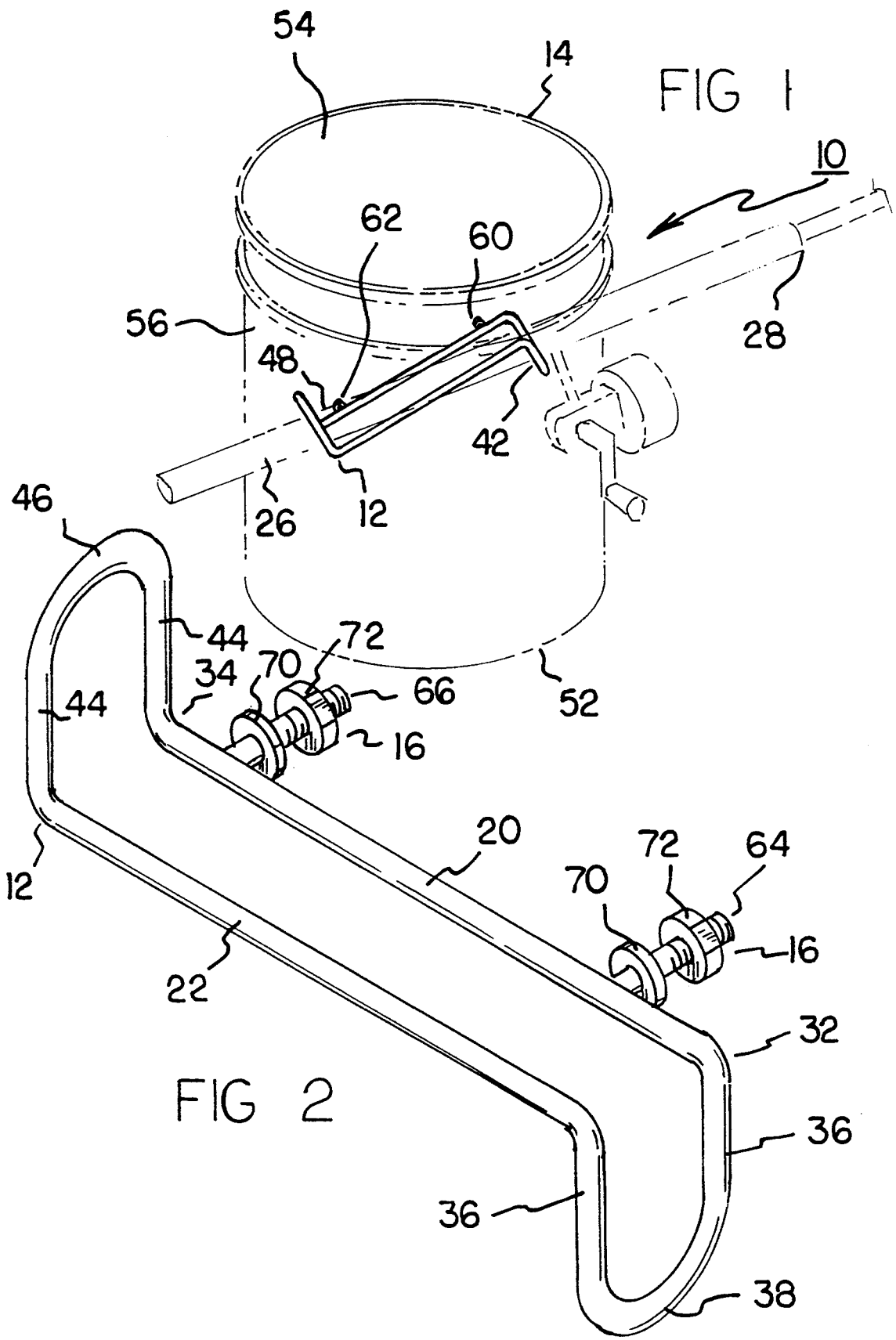

FISHING ROD HOLDER SYSTEM

BACKGROUND OF THE INVENTION

1. Field of the Invention

The present invention relates to a fishing rod holder system and more particularly pertains to a device attachable to a bucket formed of a shaped member to hold a forward and rearward portions of a fishing rod handle independent of the fisherman.

2. Description of the Prior Art

The use of fishing rod holder systems is known in the prior art. More specifically, various holding systems heretofore devised and utilized for the purpose of holding things such as fishing rods are known to consist basically of familiar, expected and obvious structural configurations, notwithstanding the myriad of designs encompassed by the crowded prior art which have been developed for the fulfillment of countless objectives and requirements.

In this respect, the fishing rod holer system according to the present invention substantially departs from the conventional concepts and designs of the prior art, and in so doing provides an apparatus primarily developed for the purpose of assisting fishermen by maintaining a fishing rod at a particular angle with respect to the horizontal. Buckets for use in association with fishing are disclosed in the prior art as exemplified by Hansen in U.S. Pat. No. D. 288,953; Leeuwen in U.S. Pat. No. 3,751,845 and Ward in U.S. Pat. No. 4,513,525. The Hansen and Leeuwen disclosures also include mechanisms for supporting additional components, the Ward device for holding fishing rods. Other patents of interest include U.S. Pat. No. 5,038,551 to Gessner and U.S. Pat. No. 5,044,109 to Fast. Such disclosures are related to mechanisms for holding fishing rods but not necessarily in association with buckets.

Therefore, it can be appreciated that there exists a continuing need for new and improved fishing rod holding systems which can be used in association with a bucket. In this regard, the present invention substantially fulfills this need.

SUMMARY OF THE INVENTION

In view of the foregoing disadvantages inherent in the known types of fishing rod holding systems now present in the prior art, the present invention provides an improved system construction wherein the same can be utilized for supporting a fishing rod on a fishing bucket at a predetermined orientation. As such, the general purpose of the present invention, which will be described subsequently in greater detail, is to provide a new and improved fishing rod holder system apparatus and method which has all the advantages of the prior art systems and none of the disadvantages.

To attain this, the present invention essentially comprises a fishing rod holder system adapted to releasably support a fishing rod, this system comprising, in combination, a steel member having a round cross section, the member being shaped to form two parallel long extents of a length several times greater than the lateral distance therebetween, the lateral distance therebetween being sufficient to receive the handle of a fishing rod, the long parallel extents having a forward end whereat the member is down-turned ninety degrees to form two short parallel extents terminating in a rounded end for receiving a forward extent of a fishing rod handle, the long parallel extents having a rearward end whereat the member is up-turned ninety degrees to form two short parallel extents terminating in a rounded end for receiving thereneath a rearward portion of a fishing rod handle; a bucket having a first hole adjacent to the upper edge and a second hole vertically and horizontally spaced from the first hole; and attachment means secured to the member for releasable coupling to the bucket, the attachment means including a first bolt extending from one of the long parallel edges away from the second parallel edge adjacent to the forward end for passing through the first hole, the attachment means also including a second bolt extending from the one of the long parallel extents in a direction away from the other long parallel extent adjacent to the rearward end for positioning through the second hole, the attachment means also including a pair of washers and a pair of nuts, the washers positionable on the bolts between the bucket and member and the nuts positionable on the bolt on the side of the bucket remote from the member whereby the curved portions of the rod will contact and support a fishing rod at an upwardly extending angle independent of a fisherman.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved fishing rod holder system which has all the advantages of the prior art holding systems and none of the disadvantages.

It is another object of the present invention to provide a new and improved fishing rod holder system which may be easily and efficiently manufactured and marketed.

It is a further object of the present invention to provide a new and improved fishing rod holder system which is of a durable and reliable construction.

An even further object of the present invention is to provide a new and improved fishing rod holder system which is susceptible of a low cost of manufacture with regard to both materials and labor, and which accordingly is then susceptible of low prices of sale to the consuming public, thereby making such fishing rod holder systems available to the buying public.

Still yet another object of the present invention is to provide a new and improved fishing rod system which provides in the apparatuses and methods of the prior art some of the advantages thereof, while simultaneously overcoming some of the disadvantages normally associated therewith.

Still another object of the present invention is to support a fishing rod with respect to a bucket in a most convenient and reliable manner.

Yet another object of the present invention is to extend the utility of buckets by utilizing them for supporting fishing rods through an intermediate bracket.

Even still another object of the present invention is to provide a new and improved system comprising a plurality of holders for supporting fishing rods to ease the burden of the fisherman.

Lastly, it is another object of the present invention to provide a new and improved fishing rod holder adapted to support a fishing rod comprising a member formed of a rigid material, the member being shaped to form two parallel long extents spaced a distance from each other sufficient to receive the handle of a fishing rod, the long parallel extents having a forward end whereas the member is down-turned to form two short parallel extents terminating in a closed end for receiving thereabove a forward portion of a fishing rod handle, the long parallel extents having a rearward end whereat the rod is up-turned to form two short parallel extents terminating in a closed end for receiving therebeneath a rearward portion of a fishing rod handle; and attachment means secured to the long parallel extents of the member for releasably coupling to a bucket.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective illustration of the fishing rod holder system of the present invention shown in association with a bucket and fishing rod illustrated in phantom lines.

FIG. 2 is a perspective illustration of the holder of FIG. 1.

DESCRIPTION OF THE PREFERRED EMBODIMENT

Figure 3:
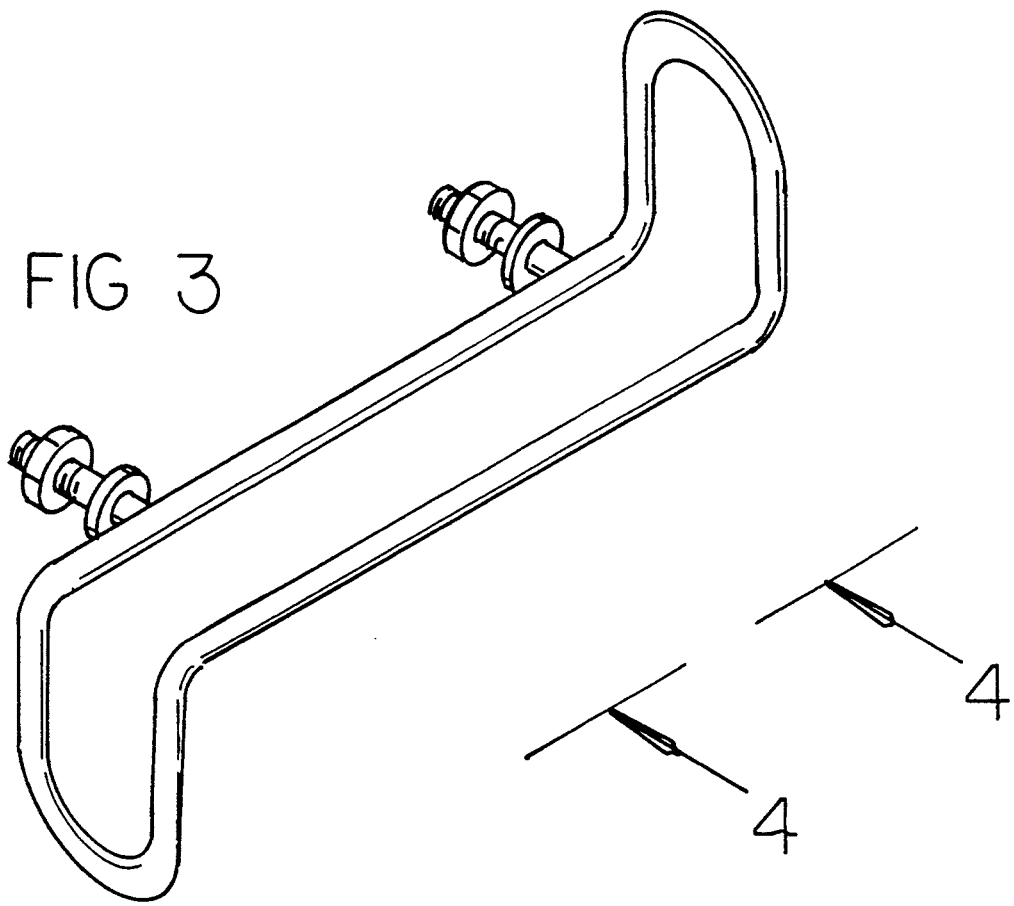
FIG. 3 is a perspective of the holder of FIGS. 1 and 2 taken from an opposite side thereof.
Figure 4:
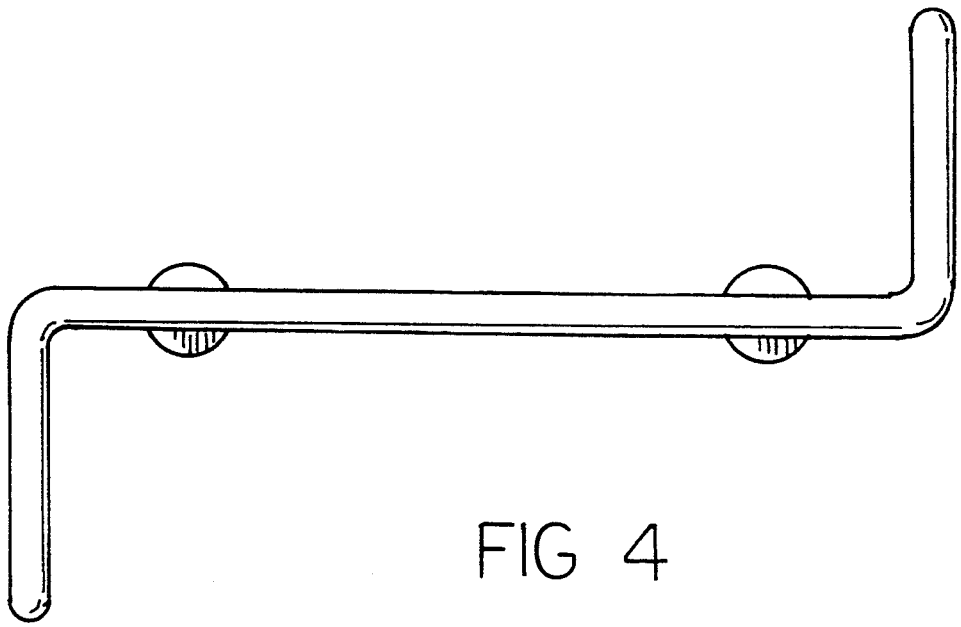
FIG. 4 is a side elevational view of the bracket of the prior Figure.

With reference now to the drawings, and in particular to FIG. 1 thereof, a new and improved fishing rod holder system embodying the principles and concepts of the present invention and generally designated by the reference numeral 10 will be described.

More specifically, it will be noted that FIG. 1 is a perspective view of the fishing rod holder system 10 constructed in accordance with the primary embodiment of the present invention. This system comprises three major components, a shaped member 12 of steel shaped to support a fishing rod of a fisherman, a bucket 14 having holes adapted for supporting the member and attachment components 16 secured to the member 12 for coupling to the bucket 14.

More specifically, the member 12 of steel is formed of a rod having a round cross section of about one-fourth inch. The rod is shaped to form two long parallel extents 20 and 22 of a length several times greater than the lateral distance between the long parallel extents. The lateral distance is sufficient to receive therebetween the handle 26 of the fishing rod 28 to be supported thereby. The long parallel extents have a forward end 32 and a rearward end 34. At the forward end the member is bent down at both long parallel extents at about ninety degrees to form two short parallel extents 36. The two short parallel extents terminate in a rounded end 38. The rounded end 38 is for receiving thereabove a forward portion 42 of the fishing rod handle 36. The long parallel extents at the rearward end 34 are turned upwardly about ninety degrees to form two short parallel extents 44. The short parallel extents 44 terminate in a rounded end 46 thereabove for receiving the upper portion 48 of a rearward portion of the fishing rod handle 36.

The bucket 14 shown in FIG. 1 is of a conventional construction having a closed bottom 52, an open top 54 and side walls 56 in a circular configuration. It is preferably provided with a conventional handle for the convenience of carrying. It is formed with a pair of holes 60 and 62 for supporting the shaped member 12 when receiving and supporting a fishing rod 36. The first hole 60 is located adjacent to the upper edge of the bucket and a second hole 62 is located spaced therefrom both vertically downwardly as well as horizontally rearwardly, this is axially and radially with respect to the axis of the bucket.

It is possible to utilize the attachment member 12 of FIG. 2 with buckets of other configurations including those with rectangular side walls, a rectangular bottom and a rectangular opening at the top. All that is needed is the two holes for receiving the attachment means which are part of the support bracket.

The third component of the system is the attachment means 16. The attachment means include bolts 64 and 66 secured as by welding and formed as a permanent part of the bracket member 12. The bolts 64 and 66 function for easy coupling and uncoupling with respect to the bucket 14. The attachment means include a first bolt 64 extending perpendicularly from adjacent the forward edge 32 of the long parallel extents 20 and 22 of the bracket member 12. A second bolt 66 is similarly permanently secured to the bracket member adjacent to the rearward extent 34 of the long parallel extents 20 and 22. The bolts 64 and 66 are of a similar size and shape and extend parallel with to each other. The attachment means also include a pair of washers 70 and a pair of nuts 72. The washers are positionable between the bucket 12 and bracket member 12. The nuts 72 are positionable on the side of the bucket 12 remote from the washers 70.

In operation and use, the removal of the bolts 64 and 66 from interior of the bucket 12 will allow the bracket member 12 to be slid out of the bucket 12 for removal when the fishing is completed. Conversely, the placing of the bracket member 12 with its bolts 64 and 66 extending through the holes 60 and 62 will allow the threaded attachment of the nuts 72 to the bolts 64 and 66 for securing the bracket in proper orientation with respect to the bucket for fishing.

In the preferred embodiment, the total distance between the holes 60 and 62 is the same as that between the bolts 64 and 66 of the bracket member 12. It is preferred that the forward end 32 of the bracket be placed through the first hole 60 at the upper elevated forward position while the second bolt 66 that adjacent to the rearward edge of the bracket member 12, be passed through the second hole 62, spaced horizontally and vertically from the first hole 60, laterally and radially with respect to the axis of the bucket. In this manner, a fishing rod 28 may be placed between the long parallel extents 20 and 22 of the bracket member with a forward end 42 of the fishing pole handle 26 resting on the curve of the forward end 38 with the rearward end 48 of the handle 26 having its upper edge contacting the curved part 46 at the rearward edge 34. Note is also taken of the total symmetry of the bracket whereby there is no front or back during actual use and it can be placed in any orientation on the bucket 12 forwardly or rearwardly.

For maximum use of the system, the bucket 12 is preferably filled about three-fourth full with water or other weighting material to preclude the fishing pole from tipping over in the event of a bite from a fish. Other materials may be utilized to fill the bucket such as sand if the fishing is being done at a beach. When using water, however, the bucket may be used for carrying back fish or other articles.

Figure 5:
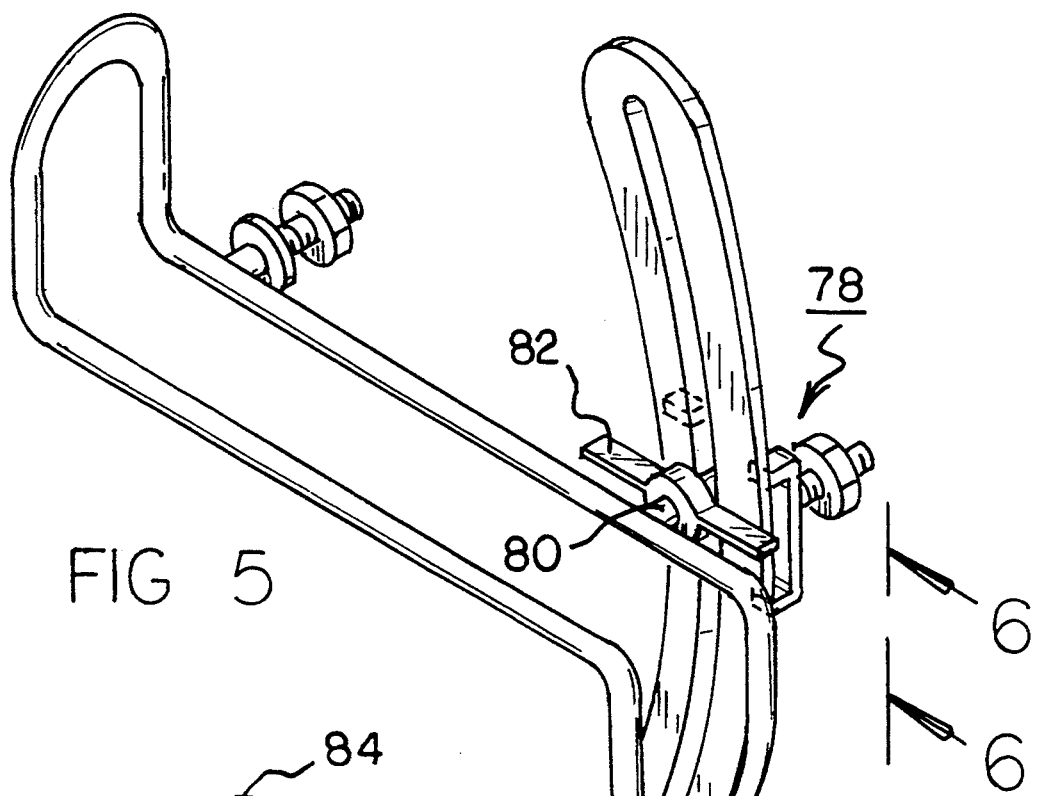
FIG. 5 is a perspective illustration showing a holder constructed in accordance with an alternate embodiment of the invention.
Figure 6:
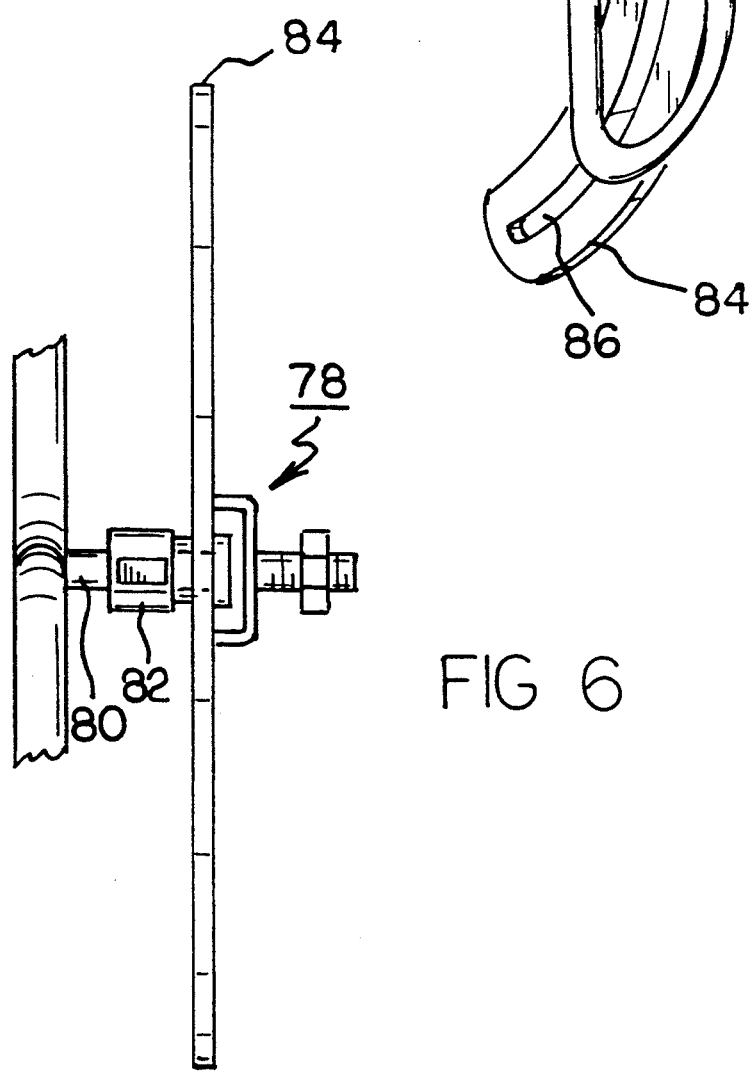
FIG. 6 is an end view of the embodiment of FIG. 5.

Shown in FIGS. 5 and 6 is an alternate embodiment of the invention. In accordance with the alternate embodiment, the first bolt 76, that which is the forward end 32 of the bracket member 12, is provided with a bolt adjustment assembly 78. Such assembly includes an outwardly extending threaded rod 80 with a tightening nut 82 threadably secured with its internal threads to the external threads of the extending rod 80. The loosening of the tightener of nut 82 by rotation causes the adjacent surfaces on opposite sides of a curved plate 84 to be engaged or disengaged. The curved plate 84 has a curved slot 86 whereby the plate 84 may be moved to an elevated or lowered position and then locked by rotation of nut 82 against the plate 84 for varying the angular orientation therebetween as a function of the particular fishing application or site. Located outboard of the plate 84 is a support bracket 88 with an extension bolt 90 for passing through the forward hole 66 of the bucket for being tightened by a nut 72 in a manner similar to that of the first embodiment.

Figure 7:
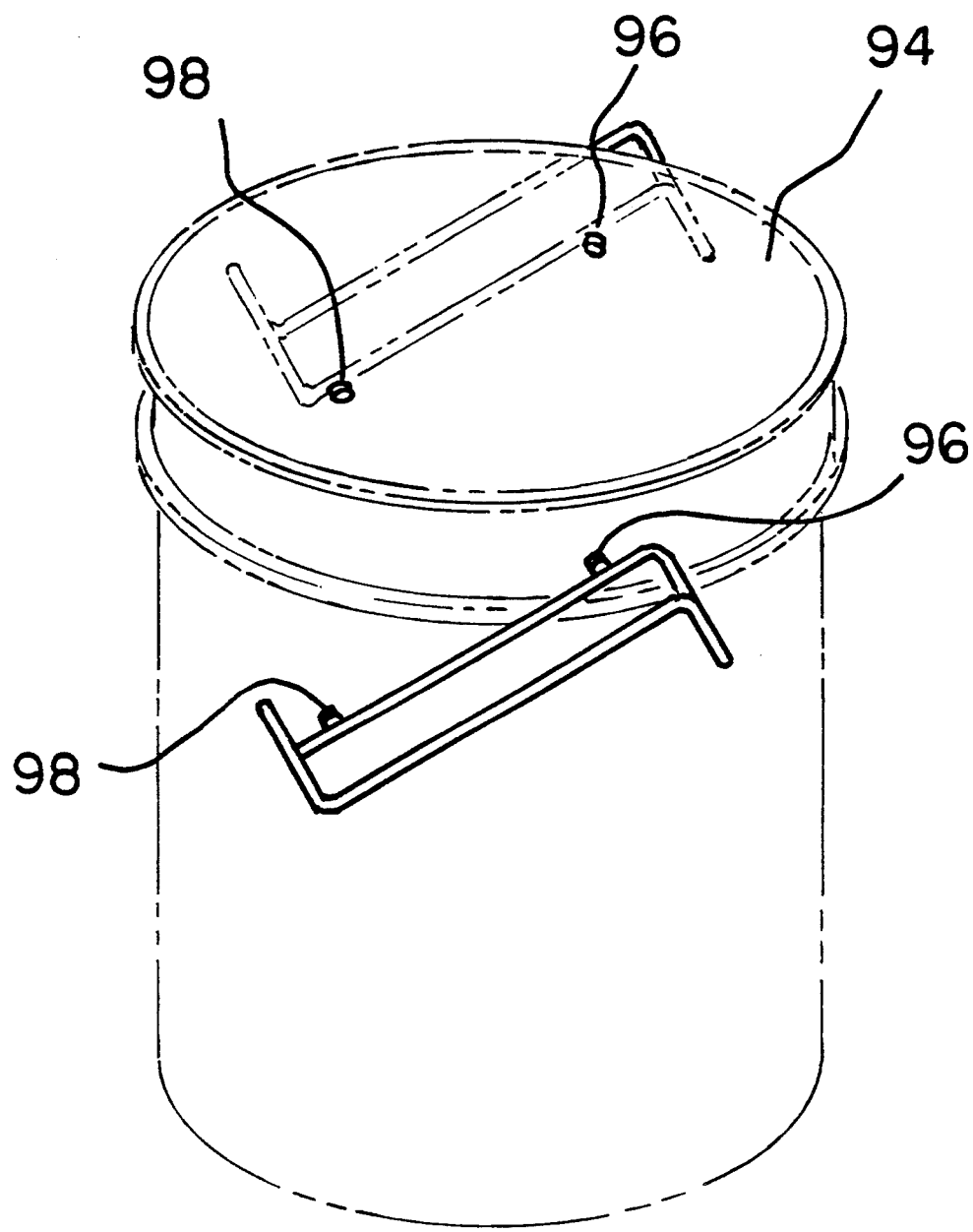
FIG. 7 is an enlarged perspective view of yet a further alternate embodiment of the present invention.

FIG. 7 shows a further alternate embodiment of the present invention. In accordance with this alternate embodiment, a pair of bracket members 12 are employed with a common bucket 94. The bucket 94 is provided with a pair of first holes 96 for receiving a first bolt 64 of a pair of bracket members 12. Similarly, a pair of second holes 98 are positioned downwardly and rearwardly of the first holes for receiving second bolts 96. The orientation of bolts and holes is as in the first embodiment. The advantage of the third embodiment is that it allows the support of a pair of fishing rods by a single fisherman.

The present invention allows a fisherman to fish from any shore, whether rocks, sand, concrete, asphalt, mud bank or the like. All that is needed is a bucket, preferably five gallons, to mount the fishing rod holder. The bucket is filled with water or sand to about three fourths of its content. The holder is preferably made of one-fourth inch round steel braised onto one-fourth standard thread bolt braised together to make a one piece holder or bracket member 12. The only other parts needed are the two washers and the two nuts. This arrangement is a system which will allow a fisherman to fish more relaxed. He no longer needs to destroy the beauty of the shore by breaking branches and moving rocks to hold a rod. The alternate embodiments allow for varying the angle at which the fishing rod is held or allowing two holders to be supported on the same bucket. This allows the fisherman to hold the extra rod and reel while fishing is done with another rod. The second support member may also be used to hold a net. With the system of the present invention the fisherman does not have to lay down his rod and reel in order to change bait. In addition, the bucket has many usages at the end of the fishing day. The fisherman can carry away trash or fish to the proper place. Further, with the bucket arranged for supporting two support members, the fisherman may mount his rod to the left side or the right side of the bucket.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A fishing rod holder system adapted to releasably support a fishing rod, this system comprising, in combination:

a steel member having a round cross section, the member being shaped to form two parallel long extents of a length several times greater than the lateral distance therebetween, the lateral distance therebetween being sufficient to receive the handle of a fishing rod, the long parallel extents having a forward end whereat the member is down-turned ninety degrees to form two short parallel extents terminating in a rounded end for receiving a forward extent of a fishing rod handle, the long parallel extents having a rearward end whereat the member is up-turned ninety degrees to form two short parallel extents terminating in a rounded end for receiving therebeneath a rearward portion of a fishing rod handle;

a bucket having a first hole adjacent to the upper edge and a second hole vertically and horizontally spaced from the first hole; and attachment means secured to the member for releasable coupling to the bucket, the attachment means including a first bolt extending from one of the long parallel edges away from the second parallel edge adjacent to the forward end for passing through the first hole, the attachment means also including a second bolt extending from the one of the long parallel extents in a direction away from the other long parallel extent adjacent to the rearward end for positioning through the second hole, the attachment means also including a pair of washers and a pair of nuts, the washers positionable on the bolts between the bucket and member and the nuts positionable on the bolt on the side of the bucket remote from the member whereby the rounded ends of the member will contact and support a fishing rod at an upwardly extending angle independent of a fisherman.

2. A fishing rod holder adapted to support a fishing rod comprising:

a member formed of a rigid material, the member being shaped to form two parallel long extents spaced a distance from each other sufficient to receive the handle of a fishing rod, the long parallel extents having a forward end whereat the member is down-turned to form two short parallel extents terminating in a closed end for receiving thereabove a forward portion of a fishing rod handle, the long parallel extents having a rearward end whereat the rod is up-turned to form two short parallel extents terminating in a closed end for receiving therebeneath a rearward portion of a fishing rod handle;

attachment means including a first bolt extending from one of the long parallel extents away from the other parallel extent adjacent to the forward end for passing through a first hole of a bucket, the attachment means also including a second bolt extending from the one of the long parallel extents in a direction away from the other long parallel extent adjacent to the rearward end for positioning through a second hole of the bucket, the attachment means including a pair of washers and a pair of nuts, the washers positionable on the bolts between the bucket and member and the nuts positionable on the bolt on the side of the bucket remote from the member whereby the closed ends of the member will contact and support a fishing rod at an upwardly extending angle independent of a fisherman; and a bucket having a first hole, said holes adjacent to its upper edge and a second hole vertically and horizontally spaced from the first hole for receiving the first and second bolts.

3. A fishing rod holder adapted to support a fishing rod comprising:

a member formed of a rigid material, the member being shaped to form two parallel long extents spaced a distance from each other sufficient to receive the handle of a fishing rod, the long parallel extents having a forward end whereat the member is down-turned to form two short parallel extents terminating in a closed end for receiving thereabove a forward portion of a fishing rod handle, the long parallel extents having a rearward end whereat the rod is up-turned to form two short parallel extents terminating in a closed end for receiving therebeneath a rearward portion of a fishing rod handle; and a pair of bolts secured to one of the long extents at the opposite ends thereof and extending away from the other long extent and in a common plane therewith for releasable coupling to a bucket.

* * * * *